United States Patent [19]

Ukita et al.

[11] Patent Number: 4,677,673
[45] Date of Patent: Jun. 30, 1987

[54] CONTINUOUS SPEECH RECOGNITION APPARATUS

[75] Inventors: Teruhiko Ukita, Fujisawa; Tsuneo Nitta, Yokohama; Sadakazu Watanabe, Kawasaki, all of Japan

[73] Assignee: Tokyo Shibaura Denki Kabushiki Kaisha, Kawasaki, Japan

[21] Appl. No.: 563,755

[22] Filed: Dec. 21, 1983

[30] Foreign Application Priority Data

Dec. 28, 1982 [JP] Japan .............................. 57-227709

[51] Int. Cl.⁴ .............................................. G10L 5/00
[52] U.S. Cl. .................................................... 381/43
[58] Field of Search .................................. 381/41–44; 364/513.5

[56] References Cited

PUBLICATIONS

IEEE Transactions on Pattern Analysis and Machine Intelligence, vol. PAMI-2, No. 2, Mar. 1980, New York, R. De Mori et al, pp. 136–148.
Systems, Computers, Controls, vol. 9, No. 3, May–Jun. 1978, Silver Spring, Md., S. Nakagawa et al.
Proceedings of the Fourth International Joint Conference on Pattern Recognition, Nov. 7–10, 1978, Kyoto, Japan.
IEEE Transactions on Acoustics, Speech, and Signal Processing, vol. ASSP-30, No. 4, Aug. 1982, "Speaker Independent Connected Word Recognition Using a Syntax-Directed Dynamic Programming Procedure", Myers and Levinson, 1982, pp. 561–565.
Proc. of Int. Conf. Acoust. Sig. Speech Proc., '81, pp. 960–963, "A Segmentation Procedure for Connected Word Recognition Based on Estimation Principles", Zelinski et al, 1981, pp. 960–963.

*Primary Examiner*—E. S. Matt Kemeny
*Attorney, Agent, or Firm*—Oblon, Fisher, Spivak, McClelland & Maier

[57] ABSTRACT

Continuous speech signal is recognized using "rough" and "detail" parameters derived from prestored reference speech and current unknown speech. The detail parameters are 16 spectral coefficients, the rough parameters 2 or 4 spectral coefficients representing the signal. A word interval detector decides segmentation based on rough parameter similarity.

9 Claims, 15 Drawing Figures

| ML1 | (FR1, FR2) | (85) | (X1) |
|---|---|---|---|
| ML2 | (FR1, FR3) | (120) | (X1) |
| ML3 | (FR1, FRE) | (220) | (X1) |
| ML4 | (FR2, FR3) | (35) | (Y1) |
| ML5 | (FR2, FRE) | (145) | (Y1) |
| ML6 | (FR3, FRE) | (100) | (X1) |

CONTINUOUS SPEECH RECOGNITION APPARATUS

BACKGROUND OF THE INVENTION

The present invention relates to a continuous speech recognition apparatus to recognize an utterance or speech generated continuously.

In word processors and audio typewriters which handle the input information by speeches, it is important to efficiently and highly reliably recognize the speech which is continuously and naturally generated. Conventionally, there has been known a continuous speech recognition apparatus which recognizes the input speech by first converting feature parameter sequence of the input speech into a series of phonemic symbols, i.e. into the so-called segment lattice using a minimum unit of the speech to be recognized as a speech segment unit. However, in the speech to be continuously generated, there may be a case where a certain speech segment is coarticulated with the speech segments to be generated before and after that segment, so that even in case of the same speech segment, it would have various different kinds of feature parameters. Due to this, it is difficult to convert the input speech into phonemic symbols with high degree of accuracy.

In addition, conventionally, there has been also known a continuous speech recognition apparatus which identifies words from the feature parameter sequence of the input speech using the minimum unit of the input speech to be recognized as a word unit, thereby recognizing a series of these identified words as a sentence. In this recognition apparatus, the reference patterns representative of respective words are used and by calculating the similarity between the feature patterns indicative of the input speech and the reference patterns, the input speech is recognized on a word unit basis; therefore, this type of apparatus is hardly affected by coarticulation between successive speech segments. Furthermore, the word identification method in this recognition apparaus is mainly divided into two methods: a first method being attained by detecting the word interval of the input speech and identifying the words in this word interval; and a second method being attained by detecting words which would possibly exist in the generation interval of the input speech without detecting the word interval. In the former word identification method, the word interval is determined by sequentially extracting the feature parameters of, e.g. the acoustic powers or acoustic spectra of the input speech and by detecting the maximal or minimal point of changes in these feature parameters. However, in the case where, for example, "I (ai)" and "eat (i:t)" are continuously generated so that when "I eat (ai:t)" is formed, there is a problem such that it is impossible to correctly detect the word intervals in this speech.

In addition, in the latter word identification method, reference patterns each having feature parameters of a plurality of frames are used for each word in the input speech, and the distances between the feature parameters of a plurality of frames of the input speech and the reference patterns are obtained for every frame, thereby determining the word which gives the minimum distance. In this case, the distances between the feature patterns of the input speech and the reference patterns are obtained by, e.g. a dynamic programming method. In this way all of the word series that can exist in the whole speech interval are detected and the word series in which the sum of the distances relating to the words is minimum among these series of words is detected, thereby recognizing the input speech.

This word identification method is effective in the case where speakers are limited and where the word identification can be executed using a small number of reference patterns. However, for unspecified speakers, the speech pattern of each word largely differs in dependence upon the speakers; therefore, it is necessary to prepare a great amount of reference patterns for each word in order to process the speech information from unspecified speakers. It is of course actually impossible to prepare the reference patterns of the number corresponding to the number of unspecified speakers and, accordingly, it is impossible to suitably recognize the speech from all of the unspecified speakers.

To cope with such a drawback, recently, an idea has been considered whereby a small limited number of reference patterns are used for each word and the speech information from unspecified speakers is processed by applying the clustering technique. In this case, however, the rate of correct recognition for a series of words will be remarkably reduced and furthermore it is necessary to calculate the distances between the reference patterns and the feature patterns of the input speech for every frame, causing the total amount of calculations of be extremely increased. Thus, it is very difficult to efficiently and highly reliably recognize the speech which are continously generated.

SUMMARY OF THE INVENTION

It is an object of the present invention to provide a continuous speech recognition apparatus which can efficiently and highly accurately recognize the speech continuously generated by unspecified speakers.

This object is accomplished by a continuous speech recognition apparatus comprising an acoustic analyzer to extract acoustic parameter patterns, each having a plurality of acoustic parameter components according to the inputted speech signal which extracts acoustic parameter components of both a coarse and fine nature (hereinafter referred to a rough and detailed). The rough and detail feature parameter data of input speech for every frame; speech interval detector; a first data generation circuit which calculates the similarity between the rough feature parameter data of a predetermined number of frames and the rough reference pattern data and generates the frame data representative of the frame position of the rough feature parameter which has given the similarity of not lower than a preset value together with the refernce pattern indicative data corresponding to the rough reference pattern data which has given the similarity of not lower than this preset value; a second data generation circuit which detects a plurality of subperiods to be obtained by dividing a speech interval in accordance with that frame data and calculates the similarity between the detail feature pattern data corresponding to each subperiod and the detail reference pattern data designated by the reference pattern indicative data corresponding to this subperiod, thereby generating each subperiod data, similarity data and reference pattern indicative data relating to this subperiod data; and a recognition circuit which detects the subperiod or a series of subperiods which constitute the speech interval and relate to the maximum similarity data on the basis of the output data from the second data generation circuit, thereby recognizing the input speech on the basis of the reference pattern indicative data relating to this detected subperiod or a series of subperiods.

In the present invention, the subperiod where the minimum unit of the speech to be recognized exists is schematicly detected using the rough feature parameters and the similarity with respect to each speech unit in the interval thus detected is calcualted, thereby determining the effective word series in the speech interval; therefore, the speeches can be efficiently and highly accurately recognized.

DETAILED DESCRIPTION OF THE PREFERRED EMBODIMENT

Figure 1:
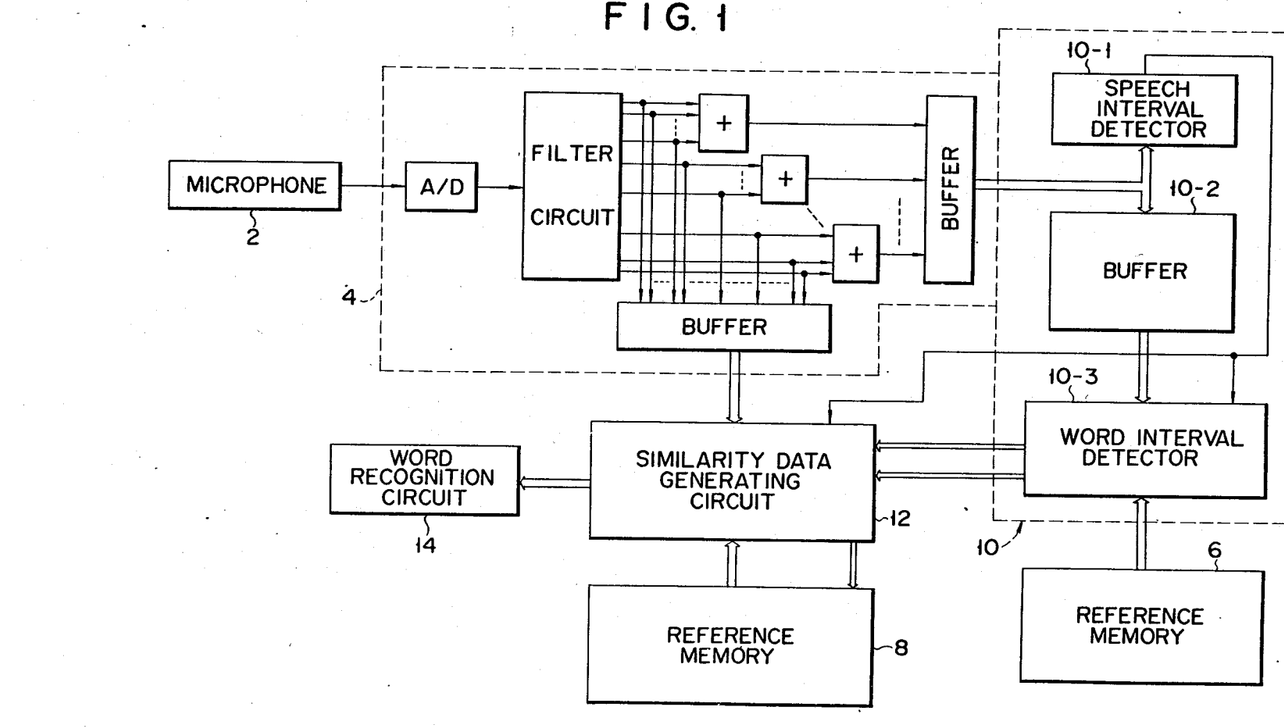
FIG. 1 is a block diagram showing a continuous speech recognition apparatus according to one embodiment of the present invention.

FIG. 1 is a block diagram showing a continuous speech recognition apparatus according to one embodiment of the present invention. This continuous speech recognition apparatus comprises a microphone 2 to generate an electrical speech signal in accordance with input speeches; an acoustic analyzer 4 to extract rough and detail feature parameter data from the speech signal supplied from this microphone 2 for every frame; and reference memories 6 and 8 in which rough and detail reference pattern data are stored, respectively. For example, as is described in U.S. Pat. No. 4,624,010 invented by Yoich Takebayashi and is assigned to the same assignee as the assignee of the present invention, the acoustic analyzer 4 includes an A/D converter to convert the speech signal from the microphone 2 into a digital signal at every 0.1 msec, for example, N band-pass filters which commonly receive the digital signal from this A/D converter and generate the output signals having the frequency bands to be obtained by dividing the frequency band of the speech signal into N channels (where, N is an integer of, e.g. 16 to 32), and N acoustic energy level detectors respectively connected to the band-pass filters. Thus, the feature parameter data including N parameters corresponding to the speech signal components having N frequency bands, respectively, is extracted as a part of the detail feature pattern data from this accoustic analyzer 4 and is stored in the buffer memory at every 10 msec, for example. In addition, by combining the output signals of the N band-pass filters to M groups (where, M is an integer of, e.g. 2 to 4), the feature parameter data including M parameters corresponding to M speech signal components having the frequency bands, respectively, to be obtained by dividing the frequency band of the speech signal into M channels is extracted as a part of the rough feature pattern data from the acoustic analyzer 4 and is stored in the buffer memory at every 10 msec. In this case, for example, the buffer memories to store part of the rough and detail feature pattern data are each constituted so as to have the memory capacity in which one-frame feature parameter data can be stored.

The reference memory 6 stores a plurality of reference pattern data, each schematically representing the front portion of each of a plurality of words to be registered, and each having F1 frames of feature parameter data which are each formed of M parameters. On the other hand, the reference memory 8 stores a plurality of reference pattern data, each representing the above-mentioned plurality of words in detail, and each having F2 frames of reference parameter data which are each formed of N parameters.

In addition, this recognition apparatus includes a probable-word-interval detection circuit 10 which fetches the rough feature parameter data from the acoustic analyzer 4 at every 10 msec, for example, and calculates the similarity between the rough feature pattern data constituted by the rough feature parameter data of F1 frames and all of the rough reference pattern data stored in the reference memory 6.

This probable-word-interval detection circuit 10 comprises a speech interval detector 10-1 to detect the speech interval on the basis of the rough feature parameter data from the acoustic analyzer 4; a buffer memory 10-2 to sequentially store the rough feature parameter data from the acoustic analyzer 4 and consequently store the rough feature pattern data constituted by the rough feature parameter data of F1 frames; and a probable-word-interval detector 10-3 which calculates the similarity between the rough feature pattern data in this buffer memory 10-2 and rough reference pattern data in the reference memory 6 and generates, whenever the similarity of not lower than a preset value is obtained, the address data corresponding to the rough reference pattern data which gives this similarity and the frame data indicative of the position of the head frame of the rough feature pattern data which gives this similarity.

This word interval detector 10-3 is constituted by, for example, a similarity calculation circuit; a counter circuit which is reset in response to the output signal indicating the start of the speech interval from the above-mentioned speech interval detector 10-1, and thereafter which counts the number of times of the calculations executed in the above-mentioned similarity calculation circuit; an address converter to convert the address data supplied to the reference memory 6 into the corresponding address data; and a control circuit which supplies the address data from the address converter to the outside whenever it is detected that the similarity of not lower than a preset value is obtained from the similarity calculation circuit, and at the same time which supplies the count data from the above-mentioned counter circuit as a frame data to the outside although these components are not shown in FIG. 1. This control circuit further supplies the output signal from the counter circuit to the outside even when the signal indicative of the end of the speech interval from the speech interval detector 10-1 is detected.

These frame data and address data from the interval detection circuit 10 are supplied to a similarity data generating circuit 12. This similarity data generating circuit 12 calculates the similarity between the detail feature pattern data from the acoustic analyzer 4 in the probable word-intervals determined by the frame data and the detail reference pattern data read out from the memory location in the reference memory 8 designated by the address data from the interval detection circuit 10. Then the circuit 12 supplies the interval data relating to the probable word-intervals, word data in the respective probable word-intervals and similarity data calculated with respect to these word data to a word recognition circuit 14. This word recognition circuit 14 detects all combinations of the probable word-interval or intervals constituting one speech interval; detects the sum of the similarity data relating to the probable word-intervals of each combination; and extracts the word series represented by the combination of probable word-intervals of which the above-mentioned sum of the similarity data becomes maximum as effective word data.

Figure 2:
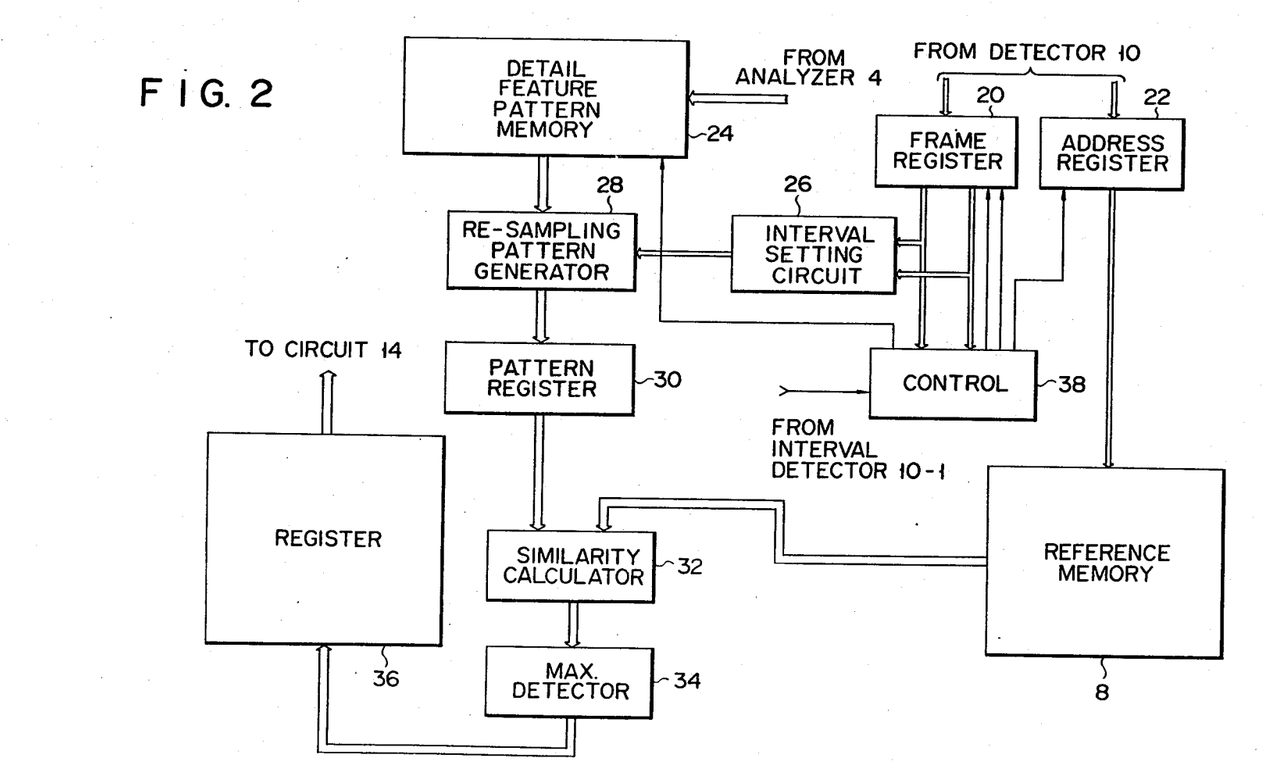
FIG. 2 is a block diagram showing a similarity data generating circuit shown in FIG. 1.

As shown in FIG. 2, the similarity data generating circuit 12 includes a frame register 20 and an address register 22 to sequentially store the frame data and address data from the interval detection circuit 10, respectively; a memory 24 to sequentially store the detail feature parameter data from the acoutic analyzer 4; an interval setting circuit 26 to set the word interval on the basis of the two frame data from the frame register 20; a re-sampling pattern generator 28 to take the detail feature parameter data read out from the memory 24 in accordance with the frame pattern corresponding to the interval data from this interval setting circuit 26; and a pattern register 30 to store the detail feature parameter data of F2 frames supplied from the memory 24 through this pattern generator 28. The similarity data generating circuit 12 further includes a similarity calculator 32 to calculate the similarity between the detail feature pattern data stored in the pattern register 30 and the corresponding reference pattern data read out from the memory 8; a maximum detector 34 to detect the maximum similarity from this similarity calculator 32; and a register 36 to sequentially store the similarity data from this maximum detector 34, front and rear frame data from the frame register 20, and address data from the address register 22. A control circuit 38 also controls the frame register 20, address register 22 and memory 24 in accordance with the front and rear frame data from the frame register 20. The similarity calculation in this embodiment can be carried out in accordance with multiple similarity calculation method disclosed in U.S. Pat. No. 3,688,267 or mixed similarity calculation method disclosed in U.S. Pat. No. 3,906,446.

The operations of the continuous speech recognition apparatus shown in FIGS. 1 and 2 will be described hereinbelow.

Figures 3A, 3B:
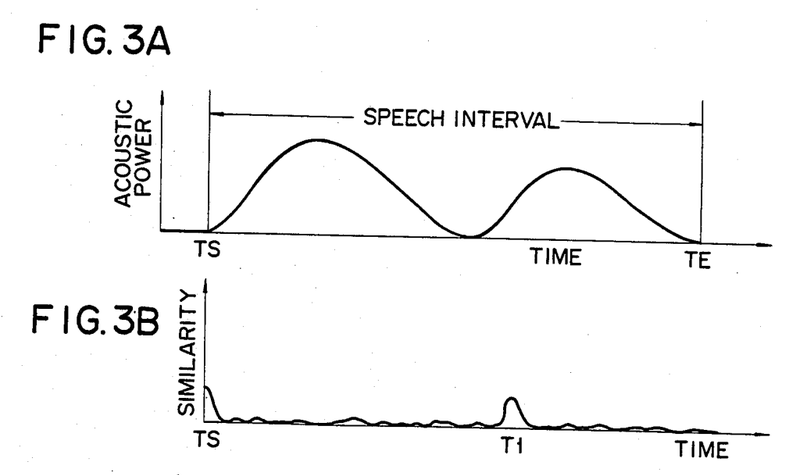
FIGS. 3A to 3E are diagrams to describe the operation of the continuous speech recognition apparatus shown in FIGS. 1 and 2.

It is now considered the case where the speech having the acoustic power characteristic as shown in FIG. 3A is supplied to the microphone 2. After this speech is converted into an electrical speech signal by this microphone 2, it is supplied to the acoustic analyzer 4. This acoustic analyzer 4 supplies the rough and detail feature parameter data in accordance with the input speech signal to the buffer 10-2 and memory 24, respectively, for every frame. The speech interval detector 10-1 detects the speech interval to be determined by the time point when it is detected that the rough feature parameter data from this acoustic analyzer 4 becomes a value not lower than a preset value and by the time point when it is detected that this rough feature parameter data becomes and is kept smaller than a preset value for a predetermined period of time.

Figure 4:
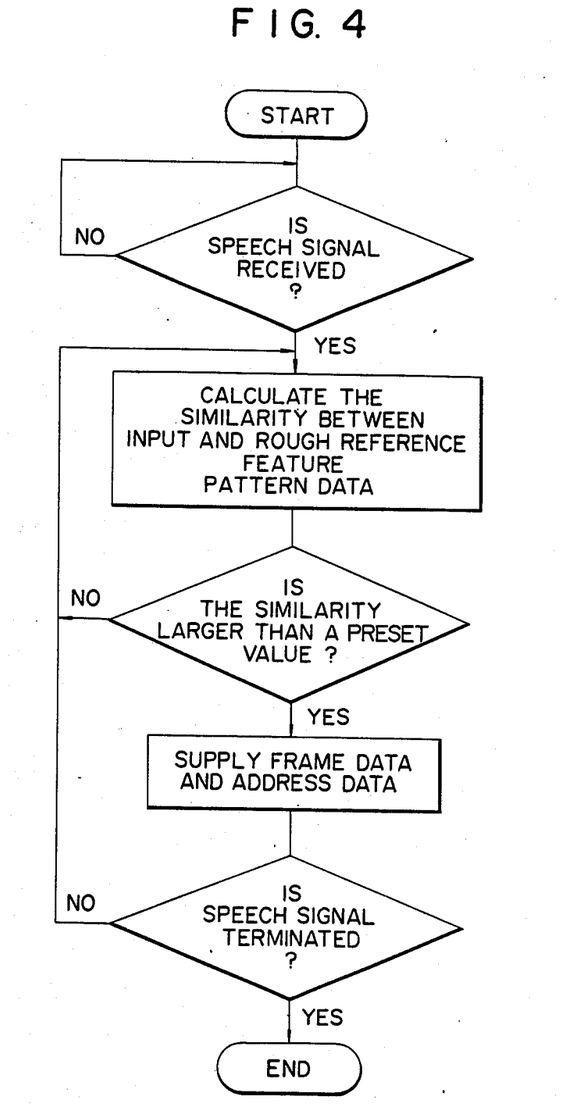
FIG. 4 is a flowchart showing the operation of the word-interval detection circuit shown in FIG. 1.

As shown in the flowchart of FIG. 4, the probable-word-interval detector 10-3 starts calculating the similarity between the rough feature pattern data in the buffer 10-2 and the rough reference pattern data in the reference memory 6 in response to the output signal indicative of the start of the speech interval from the speech interval detector 10-1. This similarity calculation processing to each rough feature pattern data in the buffer 10-2 is executed at every 10 msec, for example. When this similarity becomes a value of not lower than a preset value, this word-interval detector 10-3 supplies the frame data with respect to the frame position of the head frame of the rough characteristic pattern data in the buffer 10-2 which gives this similarity, and the address data representative of the memory location in the reference memory 8 in which the detail reference pattern data corresponding to the rough reference pattern data in the reference memory 6 which gives this similarity is stored to the similarity data generating circuit 10. The above-described operations are repeatedly executed until the speech signal is terminated.

Figure 3C:
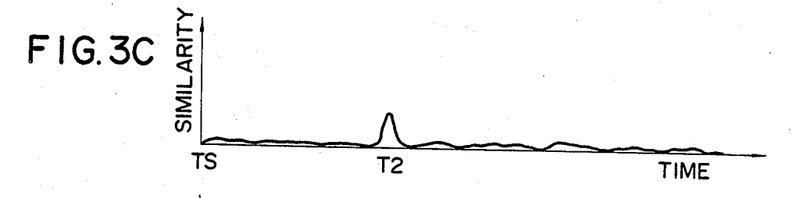
Figure 3D:
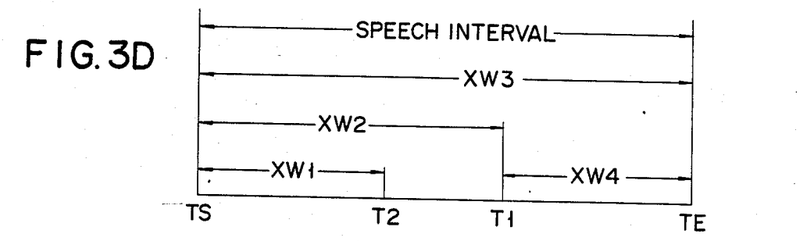
Figure 3E:
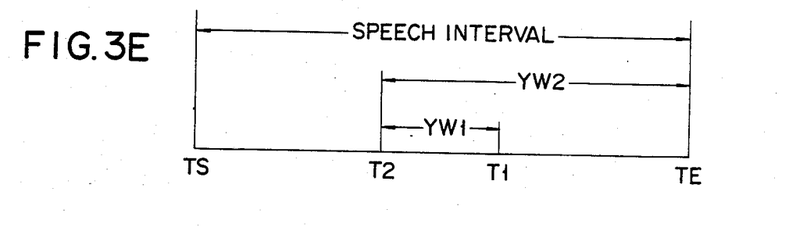

Assume now that each similarity to words [X] and [Y] exceeds the preset value in the timings TS and T1 and in the timing T2, respectively, as shown in FIGS. 3B and 3C. This means that the word [X] may be started at the respective timings TS and T1, and the word [Y] may be started at the timing T2. In this case, for example, the word-interval detector 10-3 generates frame data FR1 corresponding to the timing TS and address data X1 corresponding to word [X], then generates frame data FR2 corresponding to the timing T2 and address data Y1 corresponding to word [Y]. Thereafter, it generates frame data FR3 corresponding to the timing T1 and address data X1 corresponding to word [X], and finally generates frame data FRE corresponding to the time point TE indicative of the end of the speech interval. In this case, as probable word-intervals where there is a possibility of existence of word [X], the intervals XW1, XW2, XW3, and XW4 to be defined by the timings TS and T2, timings TS and T1, timings TS and TE, and timings T1 and TE, respectively, are extracted as shown in FIG. 3D. On the other hand, as the probable word-intervals where there is a possibility of existence of word [Y], the intervals YW1 and YW2 to be defined by the timings T2 and T1, and timings T2 and TE, respectively, are extracted as shown in FIG. 3E.

The control circuit 38 in the similarity data generating circuit 12 sets the frame register 20, address register 22 and memory 24 into the readout mode in response to the output signal indicative of the termination of the speech signal from the interval detector 10-1. Thereafter this control circuit 38 permits the frame register 20 to supply the frame data FR1 and FR2 to the interval setting circuit 26 and allows the address register 22 to supply the address data X1 to the reference memory 8. The circuit 38 further sequentially sends the readout address signals corresponding to the frame data FR1 and FR2 to the memory 24 and reads out the detail feature parameter data from the corresponding frame locations of the memory 24 for every frame. The interval setting circuit 26 supplies the output signal in response to the interval XW1 to the re-sampling pattern generator 28 in accordance with the frame data FR1 and FR2. Due to this, the re-sampling pattern generator 28 sequentially supplies the detail feature parameter data of F2 frames in predetermined frame positions among the detail feature parameter data of a plurality of frames which are read out from the memory 24 to the pattern register 30. In this way, the detail feature pattern data of N channels×F2 frames is stored in this pattern register 30 and the similarity with the reference pattern data read out from the memory location in the memory 8 which is designated by the address data X1 is calculated by the similarity calculator 32. This similarity data together with the frame data FR1 and FR2 and address data X1 is stored in the register 36. When the similarity larger than a preset value with respect to different words in the same timing is detected by the word-interval detector 10-3, the maximum detector 34 extracts, as an effective similarity data, the maximum one of the similarity data obtained by the similarity calculator 32 with respect to these different words in the same word-interval.

The control circuit 38 then sends a first control signal to the frame register 20 and permits this frame register 20 to generate the frame data FR3 from the second output port in place of the frame data FR2. Due to this the interval setting circuit 26 supplies the output signal in response to the interval XW2 to the re-sampling pattern generator 28. This re-sampling pattern generator 28 selectively supplies the detail feature parameter data of F2 frames among the detail feature parameter data which are sequentially read out from the frame positions corresponding to the interval XW2 in the memory 24 to the pattern register 30. Thereafter as already described previously, the similarity between the feature pattern data in this pattern register 30 and the reference pattern data read out from the memory location designated by the address data X1 in the reference memory 8 is calculated. This similarity data is stored in the register 36 together with the frame data FR1 and FR3 and address data X1.

The control circuit 38 then sends the first control signal to the frame register 20 and allows the frame register 20 to generate the frame data FRE from the second output port in place of the frame data FR3. Due to this, the interval setting circuit 26 supplies the output signal corresponding to the interval XW3 to the re-sampling pattern generator 28. Thereafter the same operations as described before are executed, so that the similarity data with respect to the interval XW3, frame data FR1 and FRE, and address data X1 are stored in the register 36.

Thereafter the control circuit 38 sends the first and second control signals to the frame register 20 and permits the frame register 20 to generate the frame data FR2 and FR3 from the first and second output ports in place of the frame data FR1 and FRE, respectively. Due to this, the interval setting circuit 26 supplies the output signal in response to the interval YW1 to the re-sampling pattern generator 28. In this case, the re-sampling pattern generator 28 selects the detail feature parameter data of F2 frames among the detail feature parameter data to be sequentially read out from the frame positions corresponding to the interval YW1 in the memory 24 and supplies to the pattern register 30. After that, as described previously, the similarity between the feature pattern data in this pattern register 30 and the reference pattern data read out from the memory location designated by the address data Y1 in the reference memory 8 is calculated. This similarity data is stored in the register 36 together with the frame data FR2 and FR3 are address data Y1.

Next, the control circuit 38 sends the first control signal to the frame register 20 and allows this frame register 20 to generate the frame data FRE from the second output port in place of the frame data FR3. Thereafter the same operations as described before are executed, so that the similarity data with respect to the interval YW2, frame data FR2 and FRE, and address data Y1 are stored in the register 36.

After that, the control circuit 38 sends the first and second control signals to the frame register 20 and permits this frame register 20 to generate the frame data FR3 and FRE from the first and second output ports in place of the frame data FR2 and FRE. Thus, the interval setting circuit 26 supplies the output signal in accordance with the interval XW4 to the re-sampling pattern generator 28, thereby storing the detail feature parameter data of F2 frames in the frame positions corresponding to the interval XW4 in the memory 24 in the pattern register 30. Thereafter, in the same manner as described before, the similarity between the feature pattern data in this pattern register 30 and the reference pattern data read out from the memory location designated by the address data X1 in the reference memory 8 is calculated. This similarity data is stored in the register 36 together with the frame data FR3 and FRE and address data X1.

Figure 5:
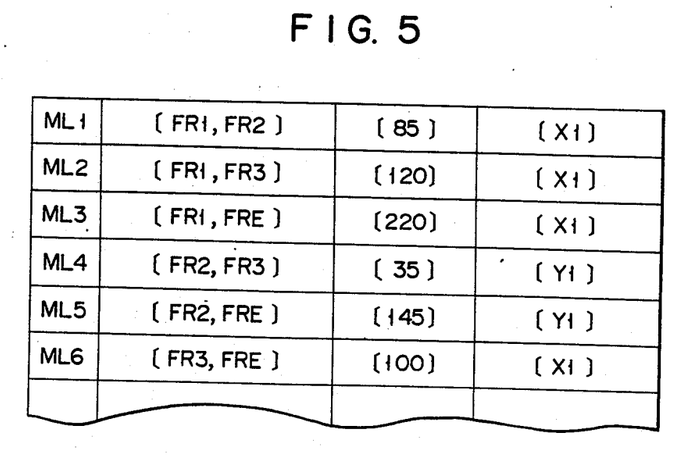
FIG. 5 shows examples of the frame data, similarity data and address data to be stored in the registers in the similarity data generating circuit shown in FIG. 2.
Figure 6:
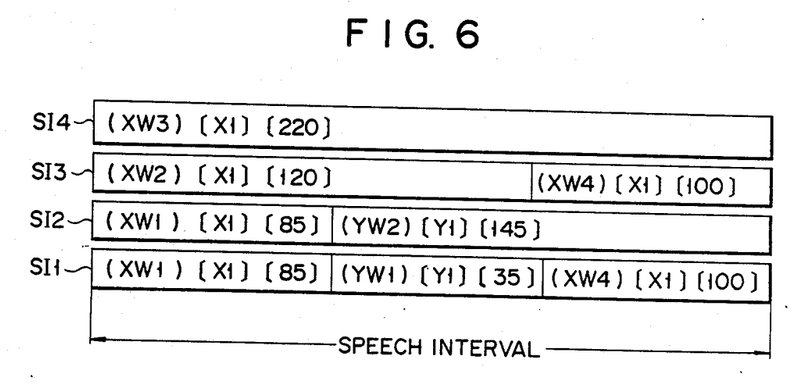
FIG. 6 shows probable speech intervals each having the length which is substantially equal to the speech interval of the input speech and is constituted by a subperiod or a combination of subperiods determined by the frame data shown in FIG. 5.

As shown in FIG. 5, the two frame data indicative of the frame interval, similarity data, and address data are stored in the memory locations ML1 to ML6 in the register 36, respectively, in such a manner as described above. As shown in FIG. 6, the individual data in these memory locations ML1 to ML6 represents the six word-intervals XW1 to XW4, YW1 and YW2 in the speech interval, and the similarity and address data with respect to those word-intervals.

The word recognition circuit 14 creates all combinations in the frame intervals constituting the speech interval on the basis of the frame data in the register 36. For instance, in this example described hereinabove, the frame intervals XW1, YW1 and XW4; frame intervals XW1 and YW2; frame intervals XW2 and XW4; and frame interval XW3 cooperatively or solely constitute the probable speech intervals SI1 to SI4, respectively. The word recognition circuit 14 calculates the sum of the similarity data relating to the respective frame interval or intervals among the speech intervals SI1 to SI4 and recognizes, as a series of effective words, a series of words determined by one of the speech intervals SI1 to SI4 having the maximum sum of similarity data.

Figure 7:
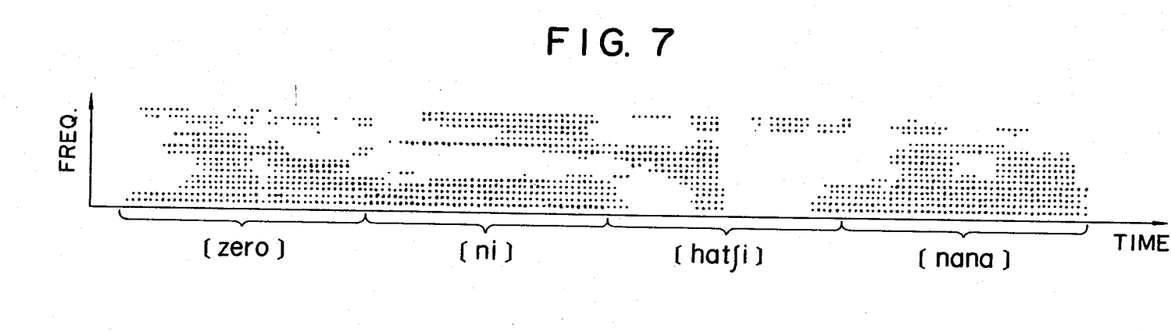
FIG. 7 shows an example of detail feature parameter data sequentially generated from an acoustic analyzer shown in FIG. 1.
Figure 8A:
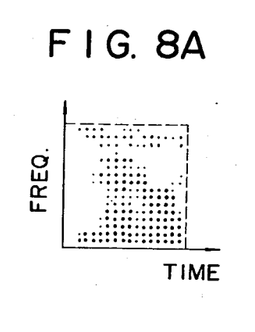
FIGS. 8A to 8D show detail feature pattern data obtained by selectively re-sampling the detail feature parameter data shown in FIG. 7.
Figure 8B:
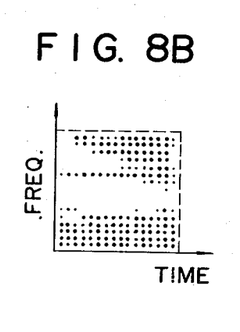
Figure 8C:
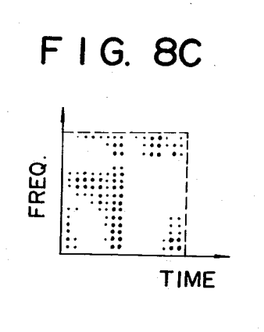
Figure 8D:
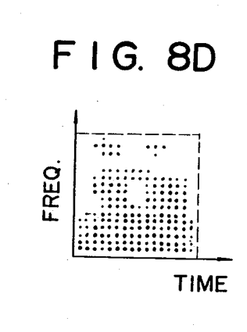

FIG. 7 shows an example of detail feature parameter data sequentially generated from the acoustic analyzer 4 and stored in the detail feature pattern memory 24. The detail feature parameter data correspond to a speech signal representing "0, 2, 8, 7 (pronounced as "[zero], [ni], [hat∫i], [nana]" in Japanese way)". In FIG. 7, the size of each black circle indicates the intensity of acoustic energy. In this example, each detail feature parameter data includes 16 parameters, and each of rough feature parameter data may be obtained by dividing 16 parameters into four groups. In this example, head frame positions of the feature pattern data representing "0", "2", "8" and "7" may be detected by sequentially calculating the similarity between the rough feature pattern data and the reference pattern data. Detail feature parameter data are selectively extracted from the sequence of feature parameter data in each word interval defined by the head frame positions. FIGS. 8A to 8D show detail feature pattern data obtained by re-sampling the feature parameter data in respective word intervals corresponding to "0", "2", "8" and "7". The similarity between each of the detail feature pattern data and each of the detail reference pattern data is sequentially calculated so that word data representing "0", "2", "8" and "7" can be detected, and stored together with the word interval data and the similarity data. Using the word data, word interval data and similarity data, input may be recognized.

Although the present invention has been described in the above with respect to one embodiment, the invention is not limited to only this embodiment. For example, although the rough feature parameter data from the acoustic analyzer 4 are sequentially stored in the buffer 10-2 for every one frame in the above-described embodiment, it is for example possible to store these rough feature parameter data in the buffer 10-2 for every other frame using a logical control circuit which is ordinarily well known.

Furthermore, in the above embodiment, until the frame data from the second output port of the frame register 20 becomes equal to "FRE", the frame data are sequentially generated from this second output port in accordance with the write-in order, and after this frame data from the second output port becomes equal to "FRE", the frame data at the first and second output port are changed so that, the interval data with respect to all of the word intervals defined by the fame data FR1 to FR3 and FRE in the speech intervals are generated from this frame register 20. However, if all of the interval data are generated, its sequence of generation should not be limited.

Furthermore although the rough reference pattern data indicative of the front portion of the detailed reference pattern of each word are stored in the reference memory 6, it is possible to store the rough reference pattern data representative of the rear portion or central portion of the detailed reference pattern of each word in place of that data in this reference memory 6. Of course in this case, the frame data to be generated from the probable-word-interval detector 10-3 represents the rear end or central frame position of the corresponding feature pattern data; therefore, in order to determine the word-interval data, the data processing should be changed accordingly.

In addition, in the above-described embodiment, words are used as a speech segment unit of the input speech to be recognized; however, it may be possible to recognize the input speech for every syllable, clause, or other speech segment unit.

It is also possible to remove the re-sampling pattern generator 28 and to use a readout circuit for sequentially applying F2 readout address signals to the memory 24 in response to the readout address signals from the control circuit 38 and the interval data from the interval setting circuit 26.

Furthermore, even if the detail feature parameter data or the output signal of the microphone 2 is supplied to the speech interval detector 10-1 in place of the rough feature parameter data, it is possible to detect the speech interval.

What is claimed is:

1. A continuous speech recognition apparatus comprising:
    speech signal generating means for generating a speech signal in accordance with input speech;
    acoustic analyzing means connected to said speech signal generating means for extracting acoustic parameter patterns, each having a plurality of acoustic parameter components according to the speech signal from said speech signal generating means for each frame, said acoustic analyzing means including a first output port from which an integer M acoustic parameter components corresponding to said plurality of extracted acoustic parameter components are generated, and a second output port from which an integer N which is smaller than M, acoustic parameter components corresponding to said plurality of extracted acoustic parameter components are generated;
    speech-interval detection means connected to said acoustic analyzing means for detecting the speech interval of the input speech;
    first and second memory means in which rough and detail reference pattern data representative of a plurality of speed units are stored;
    a first data generation circuit connected to said acoustic analyzing means and first memory means to calculate the similarity between rough feature parameter data having a predetermined number of frames of said N acoustic parameter components from said acoustic analyzing means and the plurality of rough reference pattern data stored in said first memory means and generates the frame data indicative of the frame position of the rough feature parameter data which gives the similarity of not lower than a preset value together with the reference pattern data which gives said similarity of not lower than the preset value;
    a second data generation circuit connected to said acoustic analyzing means and second memory means to detect a plurality of subperiod to be obtained by dividing the speech interval detected by said speech-interval detection means on the basis of the frame data from said first data generation circuit and calculate the similarity between detail feature pattern data having a preset number of frames of said M acoustic parameter components and representing the speech unit in each subperiod and the detail reference pattern data specified by the reference pattern indicative data corresponding to said subperiod, thereby generating the subperiod data representative of each subperiod together with the reference pattern indicative data and similarity data with respect to each subperiod data, and
    a recognition circuit which detects the sum of each similarity data relating to the subperiods in each subperiod series which constitutes said speed interval, and detects maximum one of the sums of similarity data on the basis of the output data from said second data generation circuit, thereby recognizing the speech unit data with respect to said detected subperiod series as the input speech.

2. A continuous speech recognition apparatus according to claim 1, wherein said first data generation circuit includes: a buffer memory which sequentially receives the rough feature parameter data from said acoustic analyzing means and stores the rough characteristic parameter data of a predetermined number of frames; and a data generator which detects the similarity between the rough feature parameter data of said predetermined frames stored in said buffer memory and the plurality of reference pattern data in said first memory means and generates the frame data indicative of the frame position of one of said predetermined frames of rough feature pattern data whenever said similarity becomes a value of not lower than a preset value, and at the same time which generates the reference pattern designation data corresponding to the rough reference pattern data which gave this similarity of not lower than the preset value.

3. A continuous speech recognition apparatus according to claim 2, wherein said second data generation circuit comprises: third memory means for sequentially storing the detail feature parameter data from said acoustic analyzing means; fourth and fifth memory means for sequentially storing the frame data and reference pattern instruction data from said first data generation circuit; control means for selectively reading out the frame data from said fourth memory means and reading out the detail feature parameter data from the frame positions of said third memory means corresponding to the subperiod to be determined by said frame data readout, and for reading out from said fifth memory means the reference pattern instruction data corresponding to the frame data read out from said fourth memory means and reading out the corresponding detail reference pattern data from said second memory means on the basis of said reference pattern instruction data read out; a similarity calculator to calculate the similarity between the detail reference pattern data read out from said second memory means and the detail feature parameter data of the plurality of frames read out from said third memory means; and sixth memory means for storing the frame data read out from said fourth memory means, corresponding reference pattern instruction data from said fifth memory means, and corresponding similarity data from said similarity calculator.

4. A continuous speech recognition apparatus according to claim 3, wherein said control means includes: a first control circuit to selectively read out the frame data and reference pattern instruction data from said fourth and fifth memory means, respectively; a second control circuit to read out the detail feature parameter data of a predetermined number of frames from the corresponding frame positions in said third memory means on the basis of the frame data read out from said fourth memory means; and a pattern register to store the detail feature parameter data of said predetermined number of frames from said third memory means.

5. A continuous speech recognition apparatus according to claim 2, wherein said speech interval detection means detects the speech interval on the basis of the rough reference parameter data from said acoustic analyzing means.

6. A continuous speech recognition apparatus according to claim 1, wherein said second data generation circuit comprises: third memory means for sequentially storing the detail feature parameter data from said acoustic analyzing means; fourth and fifth memory means for sequentially storing the frame data and reference pattern instruction data from said first data generation circuit; control means for selectively reading out the frame data from said fourth memory means and reading out the detail feature parameter data from the frame positions of said third memory means corresponding to the subperiod to be determined by said frame data read out, and for reading out the reference pattern instruction data corresponding to the frame data read out from said fourth memory means from said fifth memory means and reading out the corresponding detail reference pattern data from said second memory means on the basis of said reference pattern instruction data read out; a similarity calculator to calculate the similarity between the detail reference pattern data read out from said second memory means and the detail feature parameter data of the plurality of frames read out from said third memory means; and sixth memory means for storing the frame data read out from said fourth memory means, corresponding reference pattern instruction data from said fifth memory means, and corresponding similarity data from said similarity calculator.

7. A continuous speech recognition apparatus according to claim 6, wherein said control means includes: a first control circuit to selectively read out the frame data and reference pattern instruction data from said fourth and fifth memory means, respectively; a second control circuit to read out the detail feature parameter data of a predetermined number of frames from the corresponding frame positions in said third memory means on the basis of the frame data read out from said fourth memory means; and a pattern register to store the detail feature parameter data of said predetermined number of frames from said third memory means.

8. A continuous speech recognition apparatus according to claim 1, wherein said speech interval detection means detects the speech interval on the basis of the rough feature parameter data from said acoustic analyzing means.

9. A continuous speech recognition apparatus according to claim 2, wherein said second data generation circuit comprises:
   third memory means for sequentially storing the detail feature parameter data, each having said preset number of frames of M parameter components from said acoustic analyzing means;
   fourth and fifth memory means for sequentially storing the frame data and reference pattern instruction data from said first data generation circuit;
   control means for selectively reading out the frame data from said fourth memory means and reading out the detail feature parameter data from the frame positions of said third memory means corresponding to the subperiod determined by said frame data read out, and for reading out from said fifth memory means the reference pattern instruction data corresponding to the frame data read out from said fourth memory means and reading out the corresponding detail reference pattern data from said second memory means on the basis of said reference pattern instruction data read out; a multiple similarity calculator to calculate the similarity between the detail reference pattern data read out from said second memory means and the detail feature parameter data of the plurality of frames read out from said third memory means;
   and sixth memory means for storing the frame data read out from said fourth memory means, corresponding reference pattern instruction data from said fifth memory means, and corresponding similarity data from said multiple similarity calculator.

* * * * *